(12) United States Patent
Cho

(10) Patent No.: US 8,228,414 B2
(45) Date of Patent: Jul. 24, 2012

(54) REAL-SIZE PREVIEW SYSTEM IN TERMINAL HAVING DIGITAL CAMERA FUNCTION AND CONTROL METHOD THEREOF

(75) Inventor: Young-Uk Cho, Suwon-si (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 143 days.

(21) Appl. No.: 11/936,186

(22) Filed: Nov. 7, 2007

(65) Prior Publication Data
US 2008/0297623 A1    Dec. 4, 2008

(30) Foreign Application Priority Data
May 28, 2007    (KR) .................. 10-2007-0051460

(51) Int. Cl.
*H04N 5/222* (2006.01)
(52) U.S. Cl. .................................. 348/333.11
(58) Field of Classification Search .......... 348/333.01, 348/333.05, 333.11, 333.12, 33.05, 33.11; 345/660
See application file for complete search history.

(56) References Cited

U.S. PATENT DOCUMENTS

| | | | |
|---|---|---|---|
| 5,172,234 A * | 12/1992 | Arita et al. ............. | 348/240.2 |
| 6,262,763 B1 * | 7/2001 | Totsuka et al. .......... | 348/135 |
| 6,791,709 B1 * | 9/2004 | Nakamura et al. ....... | 358/1.18 |
| 7,064,858 B2 * | 6/2006 | Iwai et al. ............. | 358/1.2 |
| 7,206,006 B2 * | 4/2007 | Nah et al. .............. | 345/698 |
| 7,298,409 B1 * | 11/2007 | Misawa ................. | 348/333.01 |
| 7,453,506 B2 * | 11/2008 | Li ........................ | 348/333.12 |
| 7,683,959 B2 * | 3/2010 | Moon et al. ............ | 348/333.05 |
| 2005/0099544 A1 * | 5/2005 | Kojima et al. .......... | 348/581 |
| 2006/0087520 A1 * | 4/2006 | Ito et al. ............... | 345/660 |

FOREIGN PATENT DOCUMENTS

JP    2003345340 A    * 12/2003
JP    2005295476 A    * 10/2005

* cited by examiner

*Primary Examiner* — Jason Chan
*Assistant Examiner* — Gary C Vieaux
(74) *Attorney, Agent, or Firm* — Cha & Reiter, LLC

(57) ABSTRACT

A real-size preview system in a terminal having a digital camera function and a control method thereof are provided. The real-size preview system includes a display unit for displaying an image provided through a camera module to a user and an image processor for designating a first display area in the display unit and displaying an image, designating a second display area in the display unit and changing an image size of a region of an image previewed through the first display area to a different size to be displayed. The system enables a user to confirm the real size of a photographed object to enhance image readability.

10 Claims, 4 Drawing Sheets

REAL-SIZE PREVIEW SYSTEM IN TERMINAL HAVING DIGITAL CAMERA FUNCTION AND CONTROL METHOD THEREOF

CLAIM OF PRIORITY

This application claims the benefit of the earlier filing date, under 35 U.S.C. §119(a), to that patent application entitled "REAL-SIZE PREVIEW SYSTEM IN TERMINAL HAVING DIGITAL CAMERA FUNCTION AND CONTROL METHOD THEREOF," filed in the Korean Intellectual Property Office on May 28, 2007 and assigned Serial No. 2007-51460, the entire contents of which are hereby incorporated herein by reference.

BACKGROUND OF THE INVENTION

1. Field of the Invention

The present invention relates to digital camera image preview systems, and in particular, a real-size preview system in a terminal having a digital camera function and a control method thereof.

2. Description of the Related Art

Improvement in a digital camera function of a portable terminal may cause a preview image to differ in size from a picture that is actually taken.

In a conventional portable terminal, a preview function of a digital camera scales down an image and displays it to a user.

In a conventional portable terminal having such a digital camera function, a preview image is displayed smaller than an actually photographed image, and thus a user cannot see the size of the photographed image.

SUMMARY OF THE INVENTION

The present invention provides a real-size preview system in a terminal having a digital camera function, enabling a user to see the real size of a photographed object by displaying the real size of the object through a digital module, and a control method thereof.

According to a first aspect of the present invention, a real-size preview system in a terminal having a digital camera function includes a display unit for displaying an image provided through a camera module to a user and an image processor for designating a first display area in the display unit, displaying an image, designating a second display area and changing an image size of a region of the image previewed through the first display area to a different size to be displayed.

With an LCD that is 3.2 cm wide and an actually photographed image that is 16.93 cm wide, the size of an actually photographed image of 640×480 resolution that the image processor displays on the second display area may be previewed in real size when image of the second display area is enlarged by a magnification (x) of 5.29, derived from 3.2:16.93=1:x, wherein "x" represents magnification of the image. The selected portion of the image shown in the first display area is enlarged and then shown in the second display area. In the embodiment, the second display area shows a selected portion of the image in the first display by enlarging it, thus the second display area may exceed the first display area.

Here, the image processor may designate one side of the display unit as a first display area, and an opposite side of the first display area as a second display area.

Further, the display unit may separately include a first display unit for displaying the first display area and a second display unit for displaying the second display area.

Meanwhile, the image processor may be applied when an image previously photographed and stored in a storage unit is displayed to a user through the display unit or when an image to be photographed through the digital camera module is previewed.

According to a second aspect of the present invention, a method of controlling a real-size preview in a terminal having a digital camera function includes the steps of designating a first display area in a display unit and displaying an image by an image processor of the terminal and designating a second display area in the first display area and changing an image size of an arbitrary region of an image previewed through the first display area to a different size to be displayed. The first and second display areas may be of fixed size and the image in the second display may be magnified by a predetermined ratio. In an alternate embodiment, the first and second display areas may be fixed or may be varied.

With an LCD that is 3.2 cm wide and an actually photographed image that is 16.93 cm wide, the size of an image of 640×480 resolution that the image processor displays on the second display area may be previewed in real size when image of the second display area is enlarged by a magnification (x) of 5.29, derived from 3.2:16.93=1:x, wherein "x" represents magnification of the image.

Also, the step of displaying an image on the display unit by the image processor of the terminal may include the step of designating one side of the display unit as a first display area and an opposite side of the first display area as a second display area.

Meanwhile, the method may include respectively displaying an image on a first display unit for displaying the first display area and a separate second display unit for displaying the second display area.

The method of controlling a real-size preview in a terminal having a digital camera function may be applied when an image previously photographed and stored in a storage unit is displayed to a user through the display unit.

Furthermore, the method of controlling a real-size preview in a terminal having a digital camera function may be applied when an image to be photographed through a digital camera module is previewed.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Now, embodiments of the present invention will be described in detail with reference to the accompanying drawings. For the purposes of clarity and simplicity, a detailed description of known functions and configurations incorporated herein has been omitted for conciseness.

Figure 1:
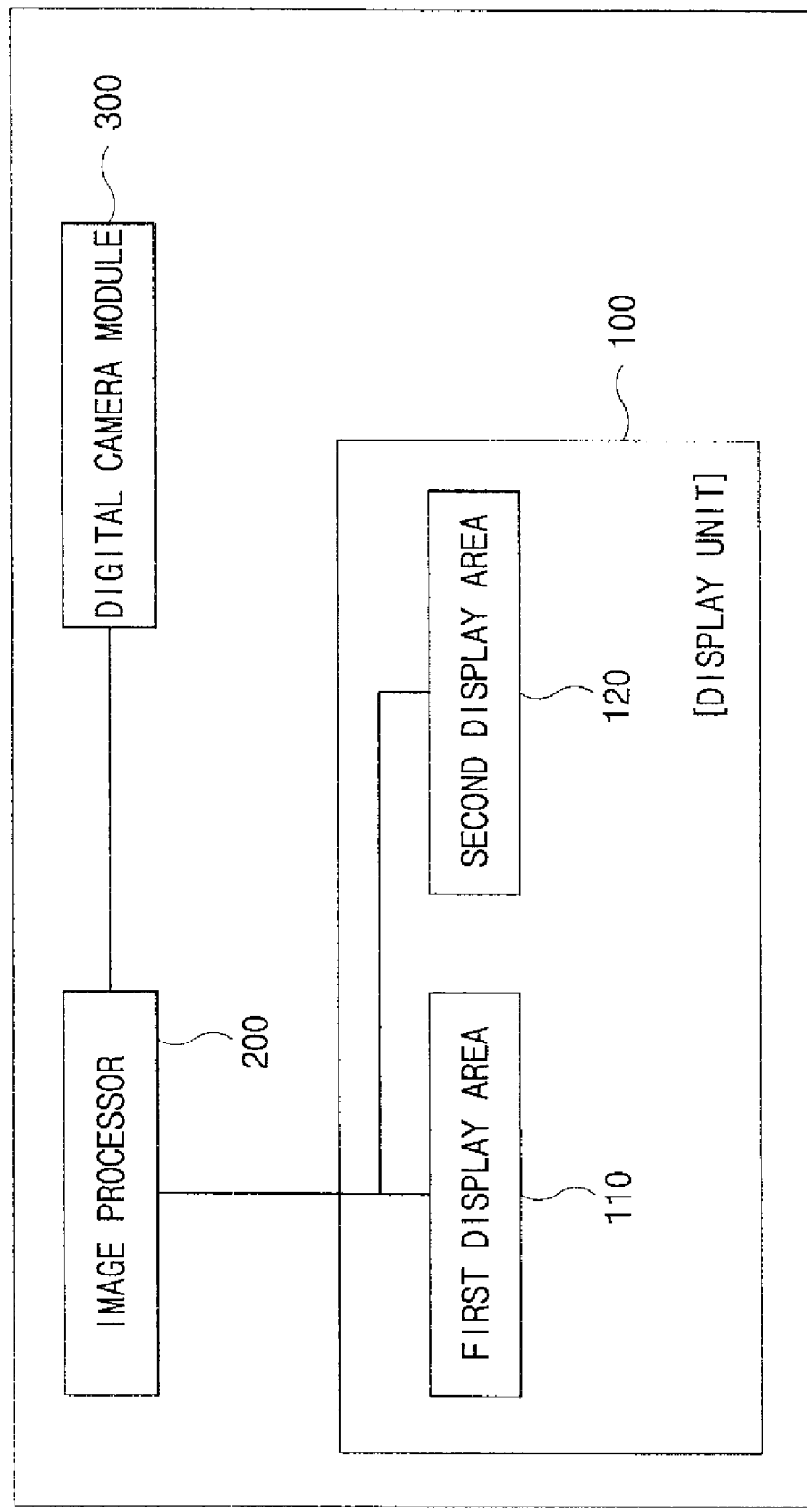
FIG. 1 is a functional block diagram illustrating the configuration of a real-size preview system in a terminal having a digital camera function according to an exemplary embodiment of the present invention.

FIG. 1 illustrates the configuration of a real-size preview system in a terminal having a digital camera function. The real-size preview system in a terminal having a digital camera function includes a display unit 100 and an image processor 200.

The display unit 100 displays an image provided through a camera module to a user. Here, the display unit 100 may include a first display unit 100-1 for displaying a first display area 110 and a second display unit 100-2 for displaying a second display area 120. In another aspect, the display unit 100 may be divided into a first display area 110 and a second display area 120.

Figure 2:
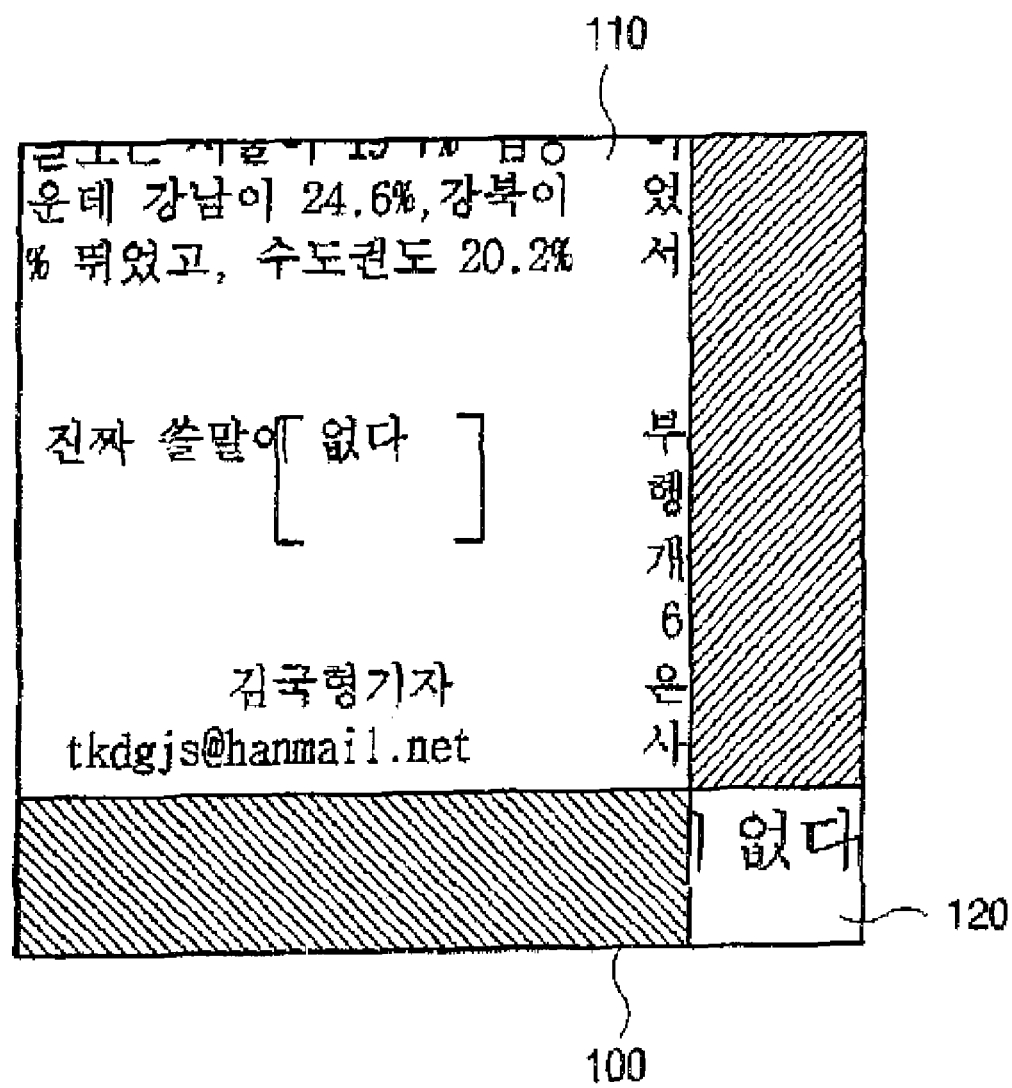
FIG. 2 illustrates a preview of a first display area and a second display area in the real-size preview system in a terminal having a digital camera function of FIG. 1.

The image processor 200 designates the first display area 110 in the display unit 100, for displaying an image, designates the second display area 120 in the display unit and changes an image size of a region selected from an image previewed through the first display area 110 to an image of a different size to be displayed. Here, with an LCD that is 3.2 cm wide and an actually photographed image that is 16.93 cm wide, the size of an image of 640×480 resolution that the image processor 200 displays on the second display area 120 may be previewed in real size when image of the second display area is enlarged by a magnification (x) of 5.29, derived from 3.2:16.93=1:x. As illustrated in FIG. 2, the image processor 200 designates one side of the display unit 100 as the first display area 110, and designates an opposite side of the display area 100 as the second display area 120. Note that it is possible to vary the size of the first display area and the second display area.

Meanwhile, the image processor 200 is applied when an image previously photographed and stored in a storage unit is displayed to a user through the display unit 100 or when an image to be photographed through a digital camera module 300 is previewed.

Descriptions of general functions and detailed operations of the above components will be omitted; only operations of the components corresponding to the present invention will be described below.

As illustrated in FIG. 2, an image is provided through a camera module of the terminal, an image screen photographed through the display unit 100 is displayed to a user.

Here, the image processor 200 divides the display unit 100 into a first display area 110 and a second display area 120.

That is, the image processor 200 displays a preview of the image presented through the camera module on the first display area 110 and changes an image size of an arbitrarily selected region of an image previewed on the first display area 110 into an image of a different size to be displayed on the second display area 120. The image displayed on the second display area 120 of the display unit 100 by the image processor 200 has the real size of the photographed object. With an LCD that is 3.2 cm wide and an actually photographed image is 16.93 cm wide, the image of 640×480 resolution may be previewed in real size when image of the second display area is enlarged by a magnification (x) of 5.29, derived from 3.2:16.93=1:x, wherein "x" represents magnification of the image.

Therefore, a user can identify an image, i.e., letters, displayed on the second display area 120.

Figure 3:
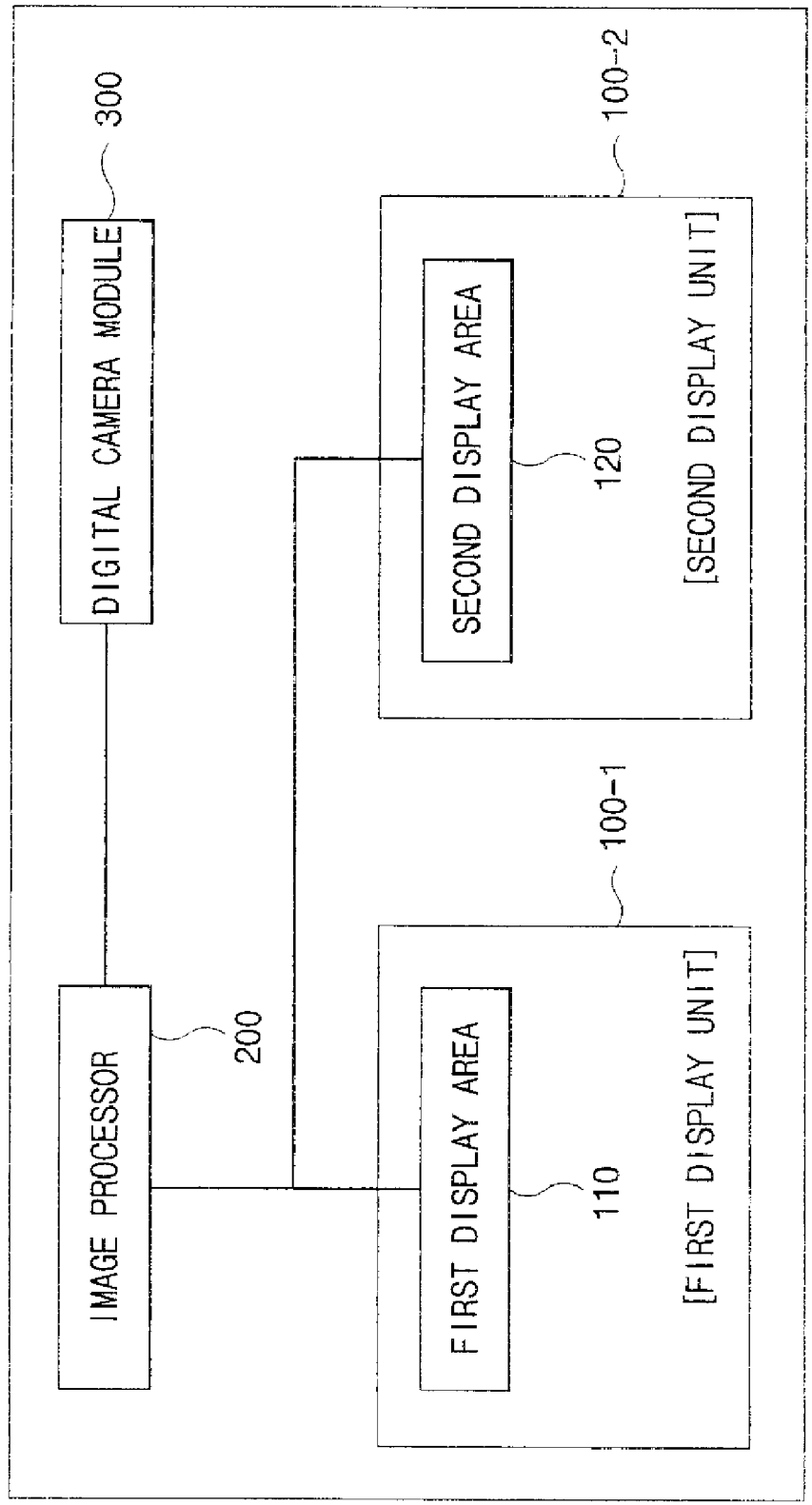
FIG. 3 is a functional block diagram illustrating the configuration of a real-size preview system in a terminal having a digital camera function according to a second exemplary embodiment of the present invention.

Illustrated in FIG. 3, is in a terminal having a digital camera function that includes two display units 100; a first display unit 100-1 corresponding to the first display area 110 and a second display unit 100-2 corresponding to the second display area 120. First display unit 100-1 and second display unit 100-2 may be separate units.

Image processor 200 displays a preview of an image presented through a camera module on the first display area 110 and changes an image size of an arbitrarily selected region of an image previewed through the first display area 110 to an image of a different size to be displayed on the second display area 120.

Meanwhile, the image processor 200 may be applied when an image to be displayed to a user through the display unit 100, is an image that may be one e previously photographed or may be one currently being photographed through a digital camera module 300.

Figure 4:
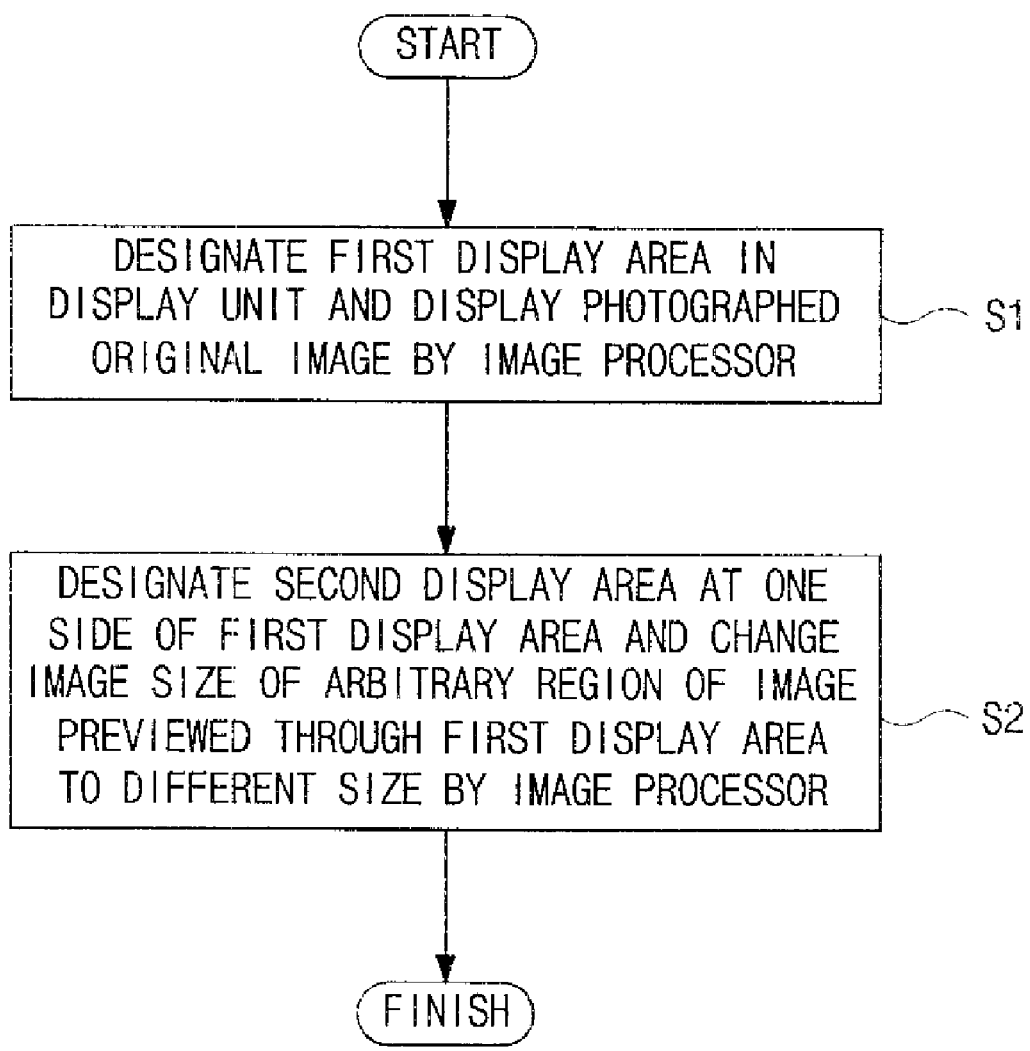
FIG. 4 is a flowchart illustrating a method of controlling a real-size preview in a terminal having a digital camera function according to an exemplary embodiment of the present invention.

A method of controlling a real size preview in a terminal having a digital camera function according to the present invention will be described with reference to FIG. 4.

First, an image processor 200 of the terminal designates a first display area 110 in a display unit 100 and displays a photographed original image (S1).

Subsequently, the image processor 200 of the terminal designates a second display area 120 at one side of the first display area 110, and changes an image size of an arbitrary region of an image previewed through the first display area 110 to an image of a different size to be displayed (S2). With an LCD that is 3.2 cm wide and an actually photographed image that is 16.93 cm wide, the size of an image of 640×480 resolution that the image processor 200 displays on the second display area 120 may be previewed in real size when image of the second display area is enlarged by a magnification (x) of 5.29, derived from 3.2:16.93=1:x, wherein "x" represents magnification of the image. In the real-size preview system in a terminal having a digital camera function and the control method thereof, the image processor 200 designates one side of the display unit 100 as the first display area 110 and another side as the second display area 120.

In the real-size preview system in a terminal having a digital camera function and the control method thereof, an image is respectively displayed on the first display unit 100-1 for displaying the first display area 110 and on the second display unit 100-2 for displaying the second display area 120.

Also, the real-size preview system in a terminal and the control method thereof are applied when an image previously photographed and stored in a storage unit is displayed through the display unit 100 or when an image to be photographed through a digital camera module 300 is previewed.

As described above, according to a real-size preview system in a terminal having a digital camera function and a control method thereof, a preview screen of a camera module displaying a whole image and a plurality of separate previews are displayed. Also, zoom-in or zoom-out may be set in the plurality of display screens by a user using a variable ratio.

In addition, a user can instantly confirm the real size of a photographed object, and thus image readability may be enhanced.

The above-described methods according to the present invention can be realized in hardware or as software or computer code that can be stored in a recording medium such as a CD ROM, an RAM, a floppy disk, a hard disk, or a magnetooptical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the present invention has been described with reference to exemplary embodiments thereof, it will be understood by those skilled in the art that various changes in form and details may be made therein without departing from the scope of the present invention as defined by the following claims.

What is claimed is:

1. A real-size preview system in a terminal having a digital camera function employing a camera module, comprising:
    a display unit; and
    an image processor for:
        designating a first display area in the display unit to display an image, said image being one of: a previously photographed image and a to-be photographed image,
        designating a second display area in the display unit and increasing an image size of a selected region of the image previewed through the first display area to be displayed in the second display area, wherein only the image in the selected region of the first display area is viewed in the second display area and the size of the image displayed in the second display area is determined by a magnification ratio, said magnification ratio being determined as a ratio of a width of the display unit to a width of the image in the first display area, wherein the width of the image in the first display area is determined based on an image resolution of the image displayed in the first display area and and the second display area is non-overlapping with the first display area.

2. The system of claim 1, wherein the image processor designates one side of the display unit as a first display area and designates an opposite side of the display unit as a second display area.

3. A method of processing an image in a terminal having a digital camera function that comprises a camera module, the method comprising:
    designating a first display area in a display unit and displaying an image by an image processor of the terminal, said image being one of: a previously photographed image and a to-be photographed image; and
    designating a second display area in the display unit and increasing an image size of a selected region of the image previewed through the first display area to be displayed in the second display area, wherein only the image in the selected region of the first display area is viewed in the second display area and wherein the image size is determined by a magnification ratio determined as a ratio of a width of the display unit to a width of the image in the first display area, wherein the width of the image is determined based on an image resolution of the image displayed in the first display area and the second display area is non-overlapping with the first display area.

4. The method of claim 3, wherein the step of displaying the image on the display unit comprises:
    designating one side of the display unit as a first display area and an opposite side of the display as a second display area.

5. An image magnifier providing images to a display unit, comprising:
    a processor in communication with a memory, said memory containing code which when accessed by the processor causes the processor to execute the steps of:
    creating a first display area and a second display area within said display unit;
    presenting an image in said first display area, said image being one of: a previously photographed image and a to-be photographed image;
    selecting a portion of the image presented in said first display area; and
    presenting a magnification of said selected image portion in said second display area, wherein a magnification ratio of said magnification of said selected image portion is determined as a ratio of a width of the display unit to a width of the image displayed in the first display area, wherein the width of the image displayed in the first display area is determined based on an image resolution of the image displayed in the first display area and the second display area is non-overlapping with the first display area.

6. The image processor of claim 5, wherein said image is provided in real-time.

7. The image processor of claim 6, wherein said image is provided by a camera module.

8. The image processor of claim 5, wherein said image is provided by a memory unit, wherein said image is stored in said memory unit.

9. The image processor of claim 5, further comprising:
    input means for selecting said image portion.

10. The image processor of claim 9, wherein said input means further provides means for zooming in to a selected portion of said image presented in said second display area.

* * * * *

UNITED STATES PATENT AND TRADEMARK OFFICE
CERTIFICATE OF CORRECTION

| | | |
|---|---|---|
| PATENT NO. | : 8,228,414 B2 | Page 1 of 1 |
| APPLICATION NO. | : 11/936186 | |
| DATED | : July 24, 2012 | |
| INVENTOR(S) | : Young-Uk Cho | |

It is certified that error appears in the above-identified patent and that said Letters Patent is hereby corrected as shown below:

Column 5, Claim 1, Line 37-38 should read as follows:
--...first display area and the second display...--

Signed and Sealed this

Thirteenth Day of November, 2012

David J. Kappos
*Director of the United States Patent and Trademark Office*